(12) United States Patent
Yang et al.

(10) Patent No.: US 12,430,113 B2
(45) Date of Patent: Sep. 30, 2025

(54) INSTALLATION METHOD NEEDLESS OF MULTIPLE REQUESTS FOR PERMISSIONS, ELECTRONIC DEVICE, AND COMPUTER READABLE STORAGE MEDIUM

(71) Applicant: Zhuhai Pantum Electronics Co., Ltd., Zhuhai (CN)

(72) Inventors: Minghui Yang, Zhuhai (CN); Liping Dong, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 248 days.

(21) Appl. No.: 18/297,265

(22) Filed: Apr. 7, 2023

(65) Prior Publication Data
US 2023/0325167 A1 Oct. 12, 2023

(30) Foreign Application Priority Data

Apr. 8, 2022 (CN) .......................... 202210369865.X
Oct. 20, 2022 (CN) .......................... 202211288574.4

(51) Int. Cl.
*G06F 8/61* (2018.01)
*G06F 21/57* (2013.01)

(52) U.S. Cl.
CPC .............. *G06F 8/63* (2013.01); *G06F 21/572* (2013.01); *G06F 2221/033* (2013.01)

(58) Field of Classification Search
CPC ..... G06F 8/63; G06F 21/572; G06F 2221/033
See application file for complete search history.

(56) References Cited

U.S. PATENT DOCUMENTS

| | | | |
|---|---|---|---|
| 9,183,380 B2 | 11/2015 | Qureshi et al. | |
| 10,025,935 B1* | 7/2018 | Anderson | G06F 21/575 |
| 11,281,768 B1* | 3/2022 | Raman | G06F 21/57 |
| 2009/0100421 A1* | 4/2009 | Flaming | G06F 8/658 |
| | | | 717/174 |
| 2010/0095294 A1* | 4/2010 | Yamada | G06F 8/61 |
| | | | 717/174 |

(Continued)

FOREIGN PATENT DOCUMENTS

| | | |
|---|---|---|
| CN | 104516754 A | 4/2015 |
| CN | 112329054 A | 2/2021 |

(Continued)

OTHER PUBLICATIONS

SAP,macOS-enterprise-privileges, https://github.com/, https://github.com/SAP/macOS-enterprise-privileges/tree/1.5.2, Nov. 10, 2020.

(Continued)

*Primary Examiner* — Kambiz Zand
*Assistant Examiner* — Afaq Ali
(74) *Attorney, Agent, or Firm* — ANOVA LAW GROUP PLLC (57) ABSTRACT

An installation method needless of multiple requests for permissions includes executing a first command after a first startup program is run under a non-administrator permission, and starting at least one installation module through a second command after a second startup program is run. The first command is configured to run the second startup program with an administrator permission, and the second command is configured to execute the startup programs with the administrator permission.

17 Claims, 6 Drawing Sheets

An installation program wants to modify system files

User name:

Password:

OK (56) References Cited

U.S. PATENT DOCUMENTS

| | | | | |
|---|---|---|---|---|
| 2010/0162201 | A1* | 6/2010 | Shnaiderman | G06F 8/71 |
| | | | | 709/227 |
| 2010/0332594 | A1* | 12/2010 | Sundarrajan | H04L 67/34 |
| | | | | 709/228 |
| 2012/0200877 | A1* | 8/2012 | Kanamori | G06F 3/1206 |
| | | | | 358/1.13 |
| 2016/0196126 | A1* | 7/2016 | Csaszar | H04L 67/34 |
| | | | | 717/178 |
| 2016/0266912 | A1* | 9/2016 | Ye | G06F 9/4401 |
| 2019/0005267 | A1 | 1/2019 | Soman et al. | |
| 2020/0371766 | A1 | 11/2020 | Sousa et al. | |
| 2021/0182398 | A1* | 6/2021 | Schack | G06F 8/654 |

FOREIGN PATENT DOCUMENTS

| | | |
|---|---|---|
| CN | 113467895 A | 10/2021 |
| RU | 2584447 C2 | 5/2016 |

OTHER PUBLICATIONS

MacOS system uses commands to install software packages, rollingstarky, Jianshu, https://www.jianshu.com/pe8f4bba2f225, May 17, 2018.

Using Shell to batch install apps on Mac, RamboPan, www.csdn.net, https://blog.csdn.net/u014443348/articledetails/102508940, Oct. 11, 2019.

* cited by examiner

Activity Monitor

| PID | Process Name | User |
|---|---|---|
| 59439 | Install Tool | User001 |
| 44007 | Install Tool | root |

INSTALLATION METHOD NEEDLESS OF MULTIPLE REQUESTS FOR PERMISSIONS, ELECTRONIC DEVICE, AND COMPUTER READABLE STORAGE MEDIUM

CROSS-REFERENCE TO RELATED APPLICATION

This application claims the priority of Chinese Patent Application No. CN202210369865.X, filed Apr. 8, 2022, and No. CN202211288574.4, filed Oct. 20, 2022, the contents of all of which are incorporated herein by reference in their entirety.

TECHNICAL FIELD

The present disclosure relates to the technical field of program installation and, more particularly, to an installation method needless of multiple requests for permissions, an electronic device, and a computer readable storage medium.

BACKGROUND

In some operating systems, when different types of functional modules are to be installed in one program installation process, a system window may need to pop up multiple times to request a user to input login passwords, which increases operation complexity and reduces user experience.

SUMMARY

In accordance with the disclosure, there is provided an installation method needless of multiple requests for permissions. The method includes executing a first command after a first startup program is run under a non-administrator permission, the first command being configured to run a second startup program with an administrator permission; and starting at least one installation module through a second command after the second startup program is run, the second command being configured to execute startup programs with the administrator permission.

In accordance with the disclosure, there is provided another installation method needless of multiple requests for permissions. The method includes repeatedly executing a third command until an installation is completed after a first startup program is run under a non-administrator permission, the third command being configured to execute an installation command in a file in a preset path with an administrator permission; and each time before the first startup program executes the third command, clearing the file and writing an installation command corresponding to a next module to be installed into the file through a first writing program.

In accordance with the disclosure, there is provided an electronic device. The electronic device includes a memory configured to store a computer program; and a processor communicatively coupled to the memory, and when the computer program is being executed, configured to perform the disclosed installation methods needless of multiple requests for permissions.

In accordance with the disclosure, there is provided a non-transitory computer readable storage medium that contain a computer program. When being executed, the computer program causes a processor to perform the disclosed installation methods needless of multiple requests for permissions.

BRIEF DESCRIPTION OF THE DRAWINGS

The accompanying drawings, which are incorporated in and constitute a part of this specification, illustrate the embodiments of the present disclosure and together with the description serve to explain the principles of the present disclosure.

DETAILED DESCRIPTION OF THE EMBODIMENTS

Various exemplary embodiments of the present disclosure will be described in detail with reference to the accompanying drawings. It should be noted that relative arrangements of components and processes, numerical expressions, and numerical values set forth in the embodiments do not limit the scope of the present disclosure unless specifically stated otherwise.

The following description of at least one exemplary embodiment is only illustrative in nature and in no way taken as any limitation of the present disclosure, and application or use thereof.

Techniques, methods, and devices known to those of ordinary skill in the art may not be discussed in detail, but where appropriate, such techniques, methods, and devices should be considered a part of this specification.

In all examples shown and discussed herein, any specific values should be construed as exemplary only, and not as limitations. Therefore, other instances of the exemplary embodiments may have different values.

It should be noted that similar numbers and letters refer to similar items in the following figures. Therefore, once an item is defined in one figure, it does not require further discussion in subsequent figures.

Figure 1:
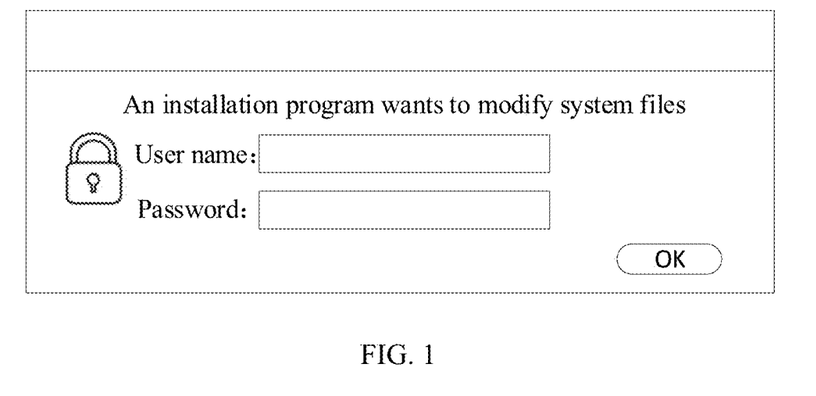
FIG. 1 illustrates a schematic diagram of a pop-up window when a permission is requested.

The purpose of the present disclosure is to provide a method in which a user is not required to input system login password multiple times. For example, in some typical Unix systems (such as Ubuntu or MacOS system), when an application program is being installed, a window will pop up if the application program needs to modify system files. An interface of a pop-up window is shown in FIG. 1. When a program to be installed has multiple functional modules that need to modify the system files, before each module is installed, an interaction interface will pop up in the system requesting the user to input the password, otherwise the installation cannot continue. For example, when a printer service program is being installed, a driver module, a network module, and a device addition module may all request for permissions from the system. At this time, multiple pop-up windows will appear successively, which reduces user experience.

There are some methods to conveniently skip password input. For example, website of developer.apple.com provides a way to write user name and password with plain text into a command to execute, or write the user name and the password into a script to read. But these methods will undoubtedly cause safety hazards, so a safe and convenient method is urgently needed to solve the above problems.

Two example embodiments provided by the present disclosure to solve the above problems are described in detail below.

Figure 2:
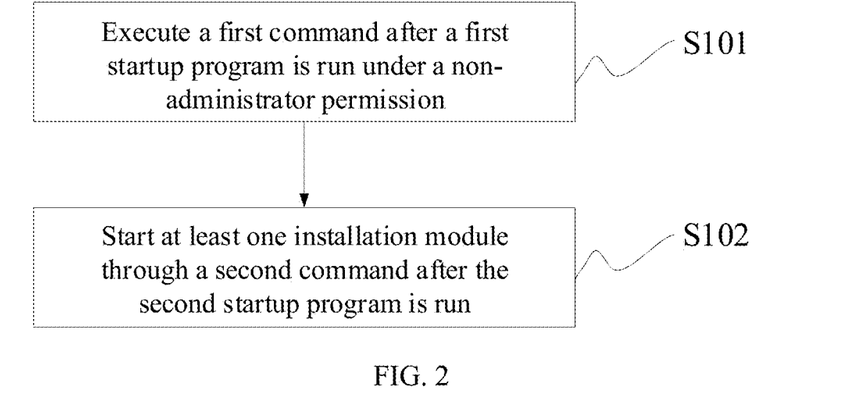
FIG. 2 illustrates a flow chart of an example embodiment of the present disclosure.

In an example embodiment, an installation method needless of multiple requests for permissions is provided. As shown in FIG. 2, the method includes processes S101 and S102.

In process S101, a first command is executed after a first startup program is run under non-administrator permission.

The first startup program may be a program for receiving user interaction. For example, the user may run the first startup program by clicking an icon of the first startup program, by inputting an operation instruction in command lines, or by using a shortcut key. It can be considered that the first startup program is an interface for the user to implement an installation process. The first startup program itself does not contain installation files.

The first command is configured to run a second startup program with administrator permission. For example, in the MacOS system, the first command may be a function provided in Apple standard library for obtaining permission, and an input parameter of the function may be a path where the second startup program is located. Considering that API functions configured to run programs with the administrator permission or execute commands with the administrator permission include some functions that were once commonly used but then officially recommended to be deprecated as the library is updated, specific function names are not provided in the present disclosure in order to prevent public from accidentally choosing deprecated functions. Those skilled in the art can use keywords such as permission to search in technical manuals such as developer manuals, and select currently recommended functions for practical use.

In process S102, a second command starts at least one installation module after the second startup program is run.

Figure 3:
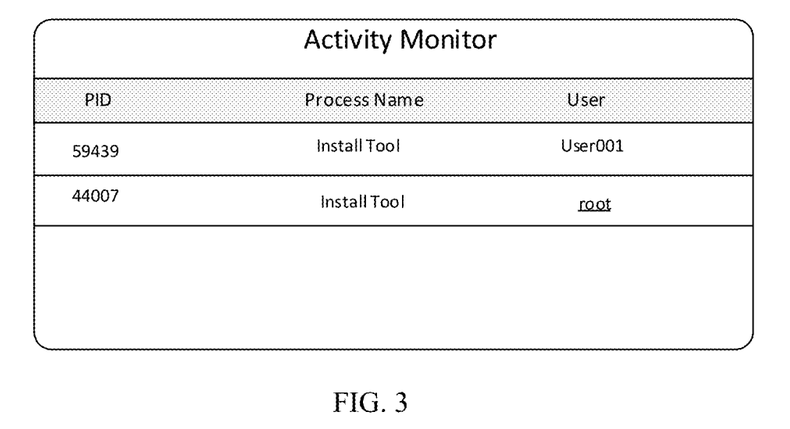
FIG. 3 illustrates an activity monitor interface diagram after a second startup program runs according to an embodiment of the present disclosure.

Since the second startup program is run with the administrator permission at this time, the second startup program may not repeatedly request permissions when using root commands again. A schematic diagram of an example is shown in FIG. 3, where a process with PID of 59439 is the first startup program. It can be seen that the first startup program is run under the non-administrator permission (the user name is the name of a user with normal permission), and a process with PID of 44007 is the second startup program. It can be seen that the second startup program has root permission after running with the first command, and the second startup program always has the root permission during the entire installation process, i.e., it is not required to input the password repeatedly no matter how many root commands that are input, followed by the second startup program. For different installation modules, the specific execution instructions may be different. For example, names of the installation modules are different, or modification operations performed are different. In some embodiments, when number of the installation modules is not less than 2, it is satisfied that each installation module needs to request for permission, and the permission that each installation module needs to request for are different from each other.

The second command is configured to execute startup programs with the administrator permission. For example, in the MacOS system, startup instructions can be executed through API provided in the Apple standard library or shell script commands. Similarly, those skilled in the art can use relevant keywords to search in the library to select the most recommended functions or scripts for use, and the specific function names are not provided in the present disclosure.

In some embodiments, a difference between the first command and the second command may be that input parameters of the first command are executable files (such as the second startup program), while the second command may be a specific operation of adding, deleting, modifying, or checking.

Figure 4:
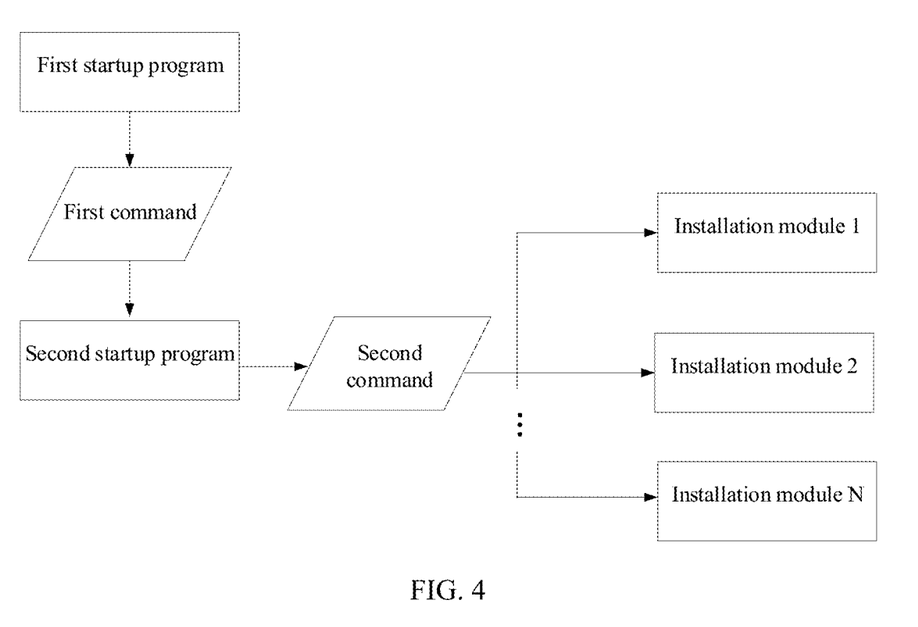
FIG. 4 illustrates a module signal relationship diagram of an example embodiment of the present disclosure.

A module signal relationship diagram of this example embodiment is shown in FIG. 4. It can be seen that the first startup program runs the second startup program through the first command, and the second startup program starts multiple installation modules through the second command.

Figure 5:
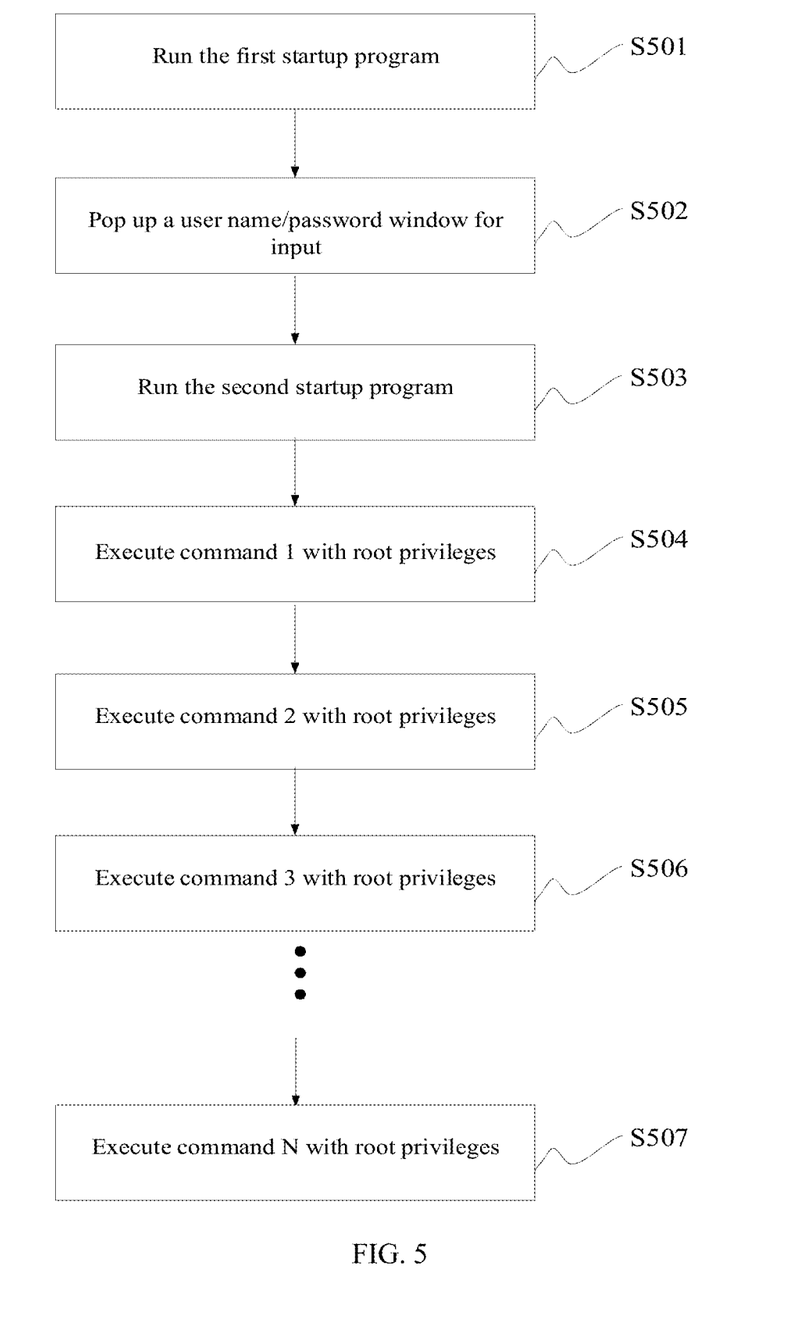
FIG. 5 illustrates a flow chart of an application example according to an embodiment of the present disclosure.

A flow chart of an application example according to this example embodiment is shown in FIG. 5. In S501, the first startup program is run. At this time, the first command is executed immediately. In S502, the system pops up a user name/password window for the user to input. In S503, the second startup program is run. In S504, command 1 with the root permission (i.e., a statement in the second command) is executed. In the subsequent S505 to S507, multiple commands with the root permission are executed by the second startup program. During the execution processes of S504-S507, the window shown in FIG. 1 may not pop up, i.e., it is only required to request for permission once in the whole process in this example embodiment.

It should be noted that this example embodiment cannot be deduced from the existing technical manuals and usage specifications of command statements. On the contrary, completely opposite teachings are given in the technical manuals. On a page of "Technical Note TN2065 do shell script in AppleScript" on the website of developer.apple.com, it is mentioned that repeated requests for permissions are unnecessary and provide no additional benefit, and developers are urged to avoid such use. To a certain extent, this page can represent general understanding of those skilled in the art, i.e., it is only needed to choose one of the commands to request for permission, and using them together may only have the same effect without additional effects. Therefore, those skilled in the art have no incentive to reuse the commands. In the present disclosure, it is found that a combination of the first command and the second command can make the second startup program always be with the root permission, and there is no need to repeatedly request for permission. The first startup program, the second startup program, the first command, and the second command are cleverly designed in the present disclosure to make the second startup program have the root permission when it is run, so that it is no longer needed to input the password when the second startup program running multiple installation packages, which greatly simplifies operation process.

In some embodiments, the installation module in the above process S102 has at least one function selected from implementing a driver installation of an image formation device, configuring a wireless network of the image formation device, and completing an addition of the image formation device. When the installation module includes at least two functions, by using the method consistent with the present disclosure, a one-click driver installation of the image formation device (such as a printer) can be achieved needless of multiple requests for permissions, and at least two operations of the driver installation, network configuration, and device addition of the image formation device can be completed, which is convenient for the user to quickly use the image formation device from a computer.

In some embodiments, in the above process S102, the second command starts at least one installation module after the second startup program is run, which refers to that, for example, an installation of a network configuration program may be started first, then the driver installation of the image formation device is started, and then an installation of adding the image formation device to the computer operating system is started. Order of the three installation processes may not be limited. Therefore, through the process S102, it is no longer needed to input the password when running multiple installation modules that are wanted to run or running multiple installation packages with the root permission, which greatly simplifies the operation process and achieves an effect of completing all installation operations after the password is input once with one key.

Further, in order to make an installation interface simple and unobtrusive, in this example embodiment, an interface of the first startup program is hidden after the second startup program is run, and/or an interface of the second startup program is hidden after the installation module is run. Since the first startup program and the second startup program do not provide a standard installation interface, and only play a function of calling commands, if the first startup program and the second startup program are always displayed, user's observation of installation progress may be interfered. Therefore, the first startup program can be hidden so that only one program is displayed on a system interface at a time.

Figure 6:
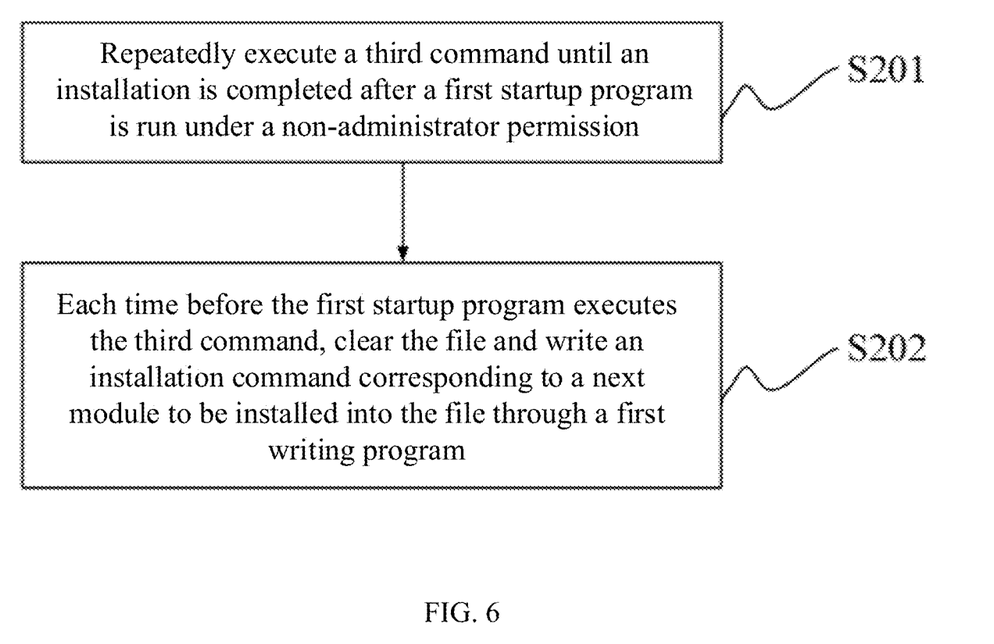
FIG. 6 illustrates a flow chart of another example embodiment of the present disclosure.

In another example embodiment, an installation method needless of multiple requests for permissions is provided. As shown in FIG. 6, the method includes processes S201 and S202.

In process S201, a third command is repeatedly executed until the installation is completed after the first startup program is run under the non-administrator permission. The first startup program may be a program for receiving user interaction. For example, the user may run the first startup program by clicking the icon of the first startup program, by inputting the operation instruction in command lines, or by using the shortcut key.

The third command is configured to execute installation commands in files in a preset path with the administrator permission, and is also configured to make a process of the third command run with the administrator permission. For example, in the MacOS system, the startup instructions can be executed through API provided in the Apple standard library or shell script commands. Similarly, those skilled in the art can use relevant keywords to search in the library to select the most recommended functions or scripts for use, and the specific function names are not provided in the present disclosure.

A difference between the third command and the first command and the second command is that an input parameter of the third command is a path, which is configured to execute a script in the path. In this example embodiment, after the permission is obtained, a password input window may not pop up repeatedly with repeated execution of the same command. Based on this, in this example embodiment, the first startup program repeatedly executes the third command to avoid multiple requests for permissions. Meanwhile, in this example embodiment, it is also needed to realize an installation process of different installation modules by a same command, which can be completed by means of process S202.

In process S202, each time before the first startup program executes the third command, a function defined in the first startup program may clear the file, and write an installation command corresponding to the next module to be installed into the file. For example, the file is empty in an initial state. Before the third command is executed for the first time, the third command writes a command for running a first installation module into the empty file. After the installation is completed, a first writing program clears the file, and then write a command for running a second installation module. After the installation is completed, the first writing program clears the file, and then write a command for running a third installation module. The process is completed until all the installation modules are run.

That is, in this example embodiment, the idea is to repeatedly execute the same script command so that the password input window may not pop up multiple times. Meanwhile, in order to actually have an effect of performing different operations, another writing module is used to continuously modify content of the script to achieve this goal.

Figure 7:
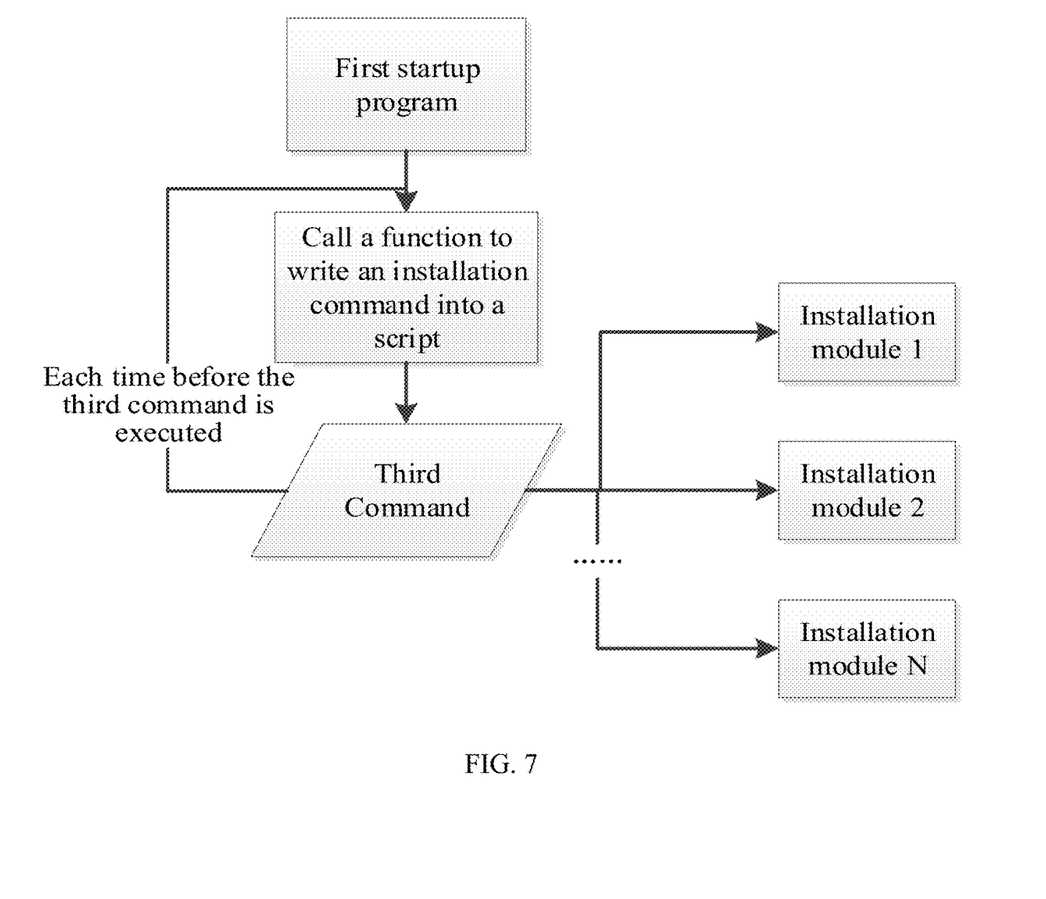
FIG. 7 illustrates a module signal relationship diagram of another example embodiment of the present disclosure.

A module signal relationship diagram of this example embodiment is shown in FIG. 7. It can be seen that the first startup program executes multiple installation modules by modifying a script file again and again.

Figure 8:
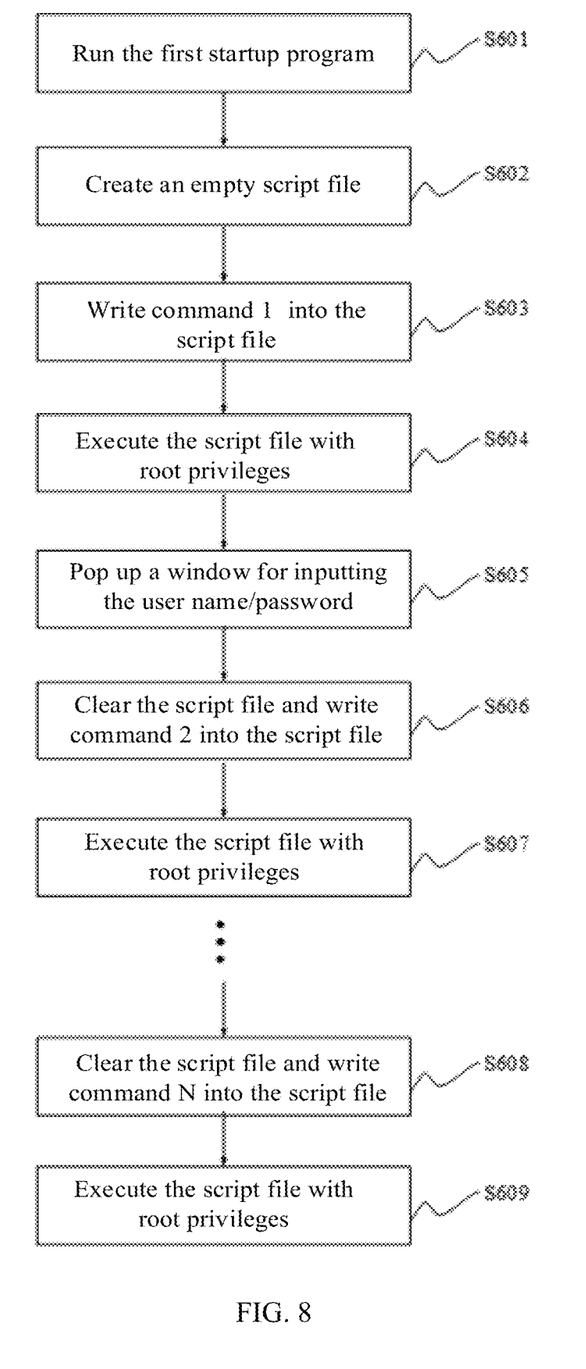
FIG. 8 illustrates a flow chart of an application example according to another embodiment of the present disclosure.

A flow chart of an application example according to this example embodiment is shown in FIG. 8. In S601, the first startup program is run, and then the third command is executed immediately. In S602, an empty script file is created. In S603, command 1 is written into the script file. In S604, the script file is executed with root permission. In S605, a window for inputting the user name/password pops up, and after the user completes inputting, the command 1 is executed. In S606, the script file is cleared and command 2 is written into the script file. In S607, the script file is executed with root permission. This process is repeated until a writing process S608 and an execution process S609 corresponding to the last command are completed. From S606 to S609, the window shown in FIG. 1 may not pop up again, i.e., it is only required to request for permission once in the whole process in this example embodiment of the present disclosure.

It should be noted that this example embodiment is not easy to be deduced from the existing technical manuals and usage specifications of command statements. The technical application examples provided by developer.apple.com do not give any technical enlightenment on how to use statement features to make multiple programs with different names run without repeatedly requesting for permissions.

In some implementations, the present disclosure also provides an electronic device, which includes one or more processors, a memory, and one or more computer programs stored in the memory. The one or more computer programs include instructions that, when executed by the electronic device, cause the electronic device to perform some or all of the processes in the method consistent with the present disclosure.

In some implementations, the present disclosure also provides a computer storage medium, where the computer storage medium may store a program, and the program may include some or all of the processes in the method consistent with the present disclosure when executed. The storage medium may be a magnetic disk, an optical disk, a read-only memory (ROM), a random access memory (RAM), etc.

In some implementations, the present disclosure also provides a computer program product, and the computer program product includes executable instructions that, when executed on a computer, cause the computer to perform some or all of the processes in the method consistent with the present disclosure.

In the embodiments of the present disclosure, "at least one" refers to one or more, and "multiple" refers to two or more. The term "and/or" is an association relationship to describe related objects, indicating that there can be three kinds of relationships. For example, A and/or B, which can mean that A exists alone, A and B exist at the same time, and B exists alone, where A and B can be singular or plural. The character "/" generally indicates that the related objects are in an "or" relationship. Expressions such as "at least one of the following" refer to any combination of items, including any combination of single or plural items. For example, at least one of a, b, and c can represent a, b, c, a-b, a-c, b-c, or a-b-c, where a, b, and c can be single or multiple.

Although some embodiments of the present disclosure have been described in detail through examples, those skilled in the art should understand that the above examples are for illustration only and not intended to limit the scope of the present disclosure. Those skilled in the art should understand that modifications can be made to the above embodiments without departing from the scope and spirit of the present disclosure. The scope of the present disclosure is defined by the appended claims.

What is claimed is:

1. An installation method needless of multiple requests for permissions comprising:
    running a first startup program under a non-administrator permission, wherein the first startup program is an interface for a user to implement an installation process and the first startup program itself does not contain installation files;
    executing a first command after the first startup program is run under the non-administrator permission, wherein the first command runs a second startup program with an administrator permission, an input parameter of the first command is the second startup program, and the first command requests a user name and password from the user for the administrator permission; and
    after the second startup program is run, starting through a second command each of at least one installation module repeatedly without requesting the user name and password from the user, wherein the second command executes the at least one installation module with the administrator permission, names of the at least one installation module are different, or modification operations performed by the at least one installation module are different, and the second command includes a specific operation of adding, deleting, modifying, or checking.

2. The installation method according to claim 1, wherein the at least one installation module includes at least one function selected from implementing a driver installation of an image formation device, configuring a wireless network of the image formation device, and completing an addition of the image formation device.

3. The installation method according to claim 1, wherein the installation method is used in a MacOS system.

4. The installation method according to claim 3, wherein the first command and the second command are application programming interfaces (APIs) or script commands in a standard library.

5. The installation method according to claim 1, wherein:
    the interface of the first startup program is hidden after the second startup program is run; or
    an interface of the second startup program is hidden after the at least one installation module is run.

6. An installation method needless of multiple requests for permissions comprising:
    running a first startup program under a non-administrator permission, wherein the first startup program is an interface for a user to implement an installation process and the first startup program itself does not contain installation files;
    creating, through a first writing program defined in the first startup program, an empty script file in a preset path;
    writing, through the first writing program, a first installation command for running a first installation module into the empty script file to obtain a script file;
    executing a third command to execute the script file with an administrator permission to execute the first installation command, wherein the third command requests a user name and password from the user for the administrator permission;
    clearing by the first writing program the script file, and writing, through the first writing program, a second installation command for running a second installation module into the script file;
    repeatedly executing the third command without requesting the user name and password from the user to execute the script file in the preset path with the administrator permission until a corresponding installation module is completed after the first startup program is run under the non-administrator permission, wherein the third command executes a corresponding installation command in the script file in the preset path with the administrator permission, and wherein an input parameter of the third command is the preset path, and the corresponding installation command includes the second installation module; and
    during repeatedly executing the third command, each time before the first startup program executes the third command, clearing by the first writing program the script file and writing by the first writing program an installation command corresponding to a next installation module to be installed into the script file.

7. The installation method according to claim 6, wherein one of the first installation module and the corresponding installation module includes at least one function selected from implementing a driver installation of an image formation device, configuring a wireless network of the image formation device, and completing an addition of the image formation device.

8. The installation method according to claim 6, wherein the installation method is used in a MacOS system.

9. The installation method according to claim 8, wherein the third command is an application programming interface (API) or a script command in a standard library.

10. An electronic device comprising:
    a memory configured to store a computer program; and
    a processor communicatively coupled to the memory, and when the computer program is executed, configured to perform an installation method needless of multiple requests for permissions, the installation method comprising:
    running a first startup program under a non-administrator permission, wherein the first startup program is an interface for a user to implement an installation process and the first startup program itself does not contain installation files:

executing a first command after the first startup program is run under the non-administrator permission, wherein the first command runs a second startup program with an administrator permission, an input parameter of the first command is the second startup program, and the first command requests a user name and password from the user for the administrator permission; and after the second startup program is run, starting through a second command each of at least one installation module repeatedly without requesting the user name and password from the user, wherein the second command executes the at least one installation module with the administrator permission, names of the at least one installation module are different, or modification operations performed by the at least one installation module are different, and the second command includes a specific operation of adding, deleting, modifying, or checking.

11. The electronic device according to claim 10, wherein the at least one installation module includes at least one function selected from implementing a driver installation of an image formation device, configuring a wireless network of the image formation device, and completing an addition of the image formation device.

12. The electronic device according to claim 10, wherein the installation method is used in a MacOS system.

13. The electronic device according to claim 12, wherein the first command and the second command are application programming interfaces (APIs) or script commands in a standard library.

14. The electronic device according to claim 10, wherein:
an interface of the first startup program is hidden after the second startup program is run; or
an interface of the second startup program is hidden after the installation module is run.

15. A non-transitory computer readable storage medium containing a computer program, that when being executed, causes a processor to perform the installation method needless of multiple requests for permissions according to claim 1.

16. An electronic device comprising:
a memory configured to store a computer program; and
a processor communicatively coupled to the memory, and when the computer program is executed, configured to perform the installation method needless of multiple requests for permissions according to claim 6.

17. A non-transitory computer readable storage medium containing a computer program, that when being executed, causes a processor to perform the installation method needless of multiple requests for permissions according to claim 6.

* * * * *